Figure 1:
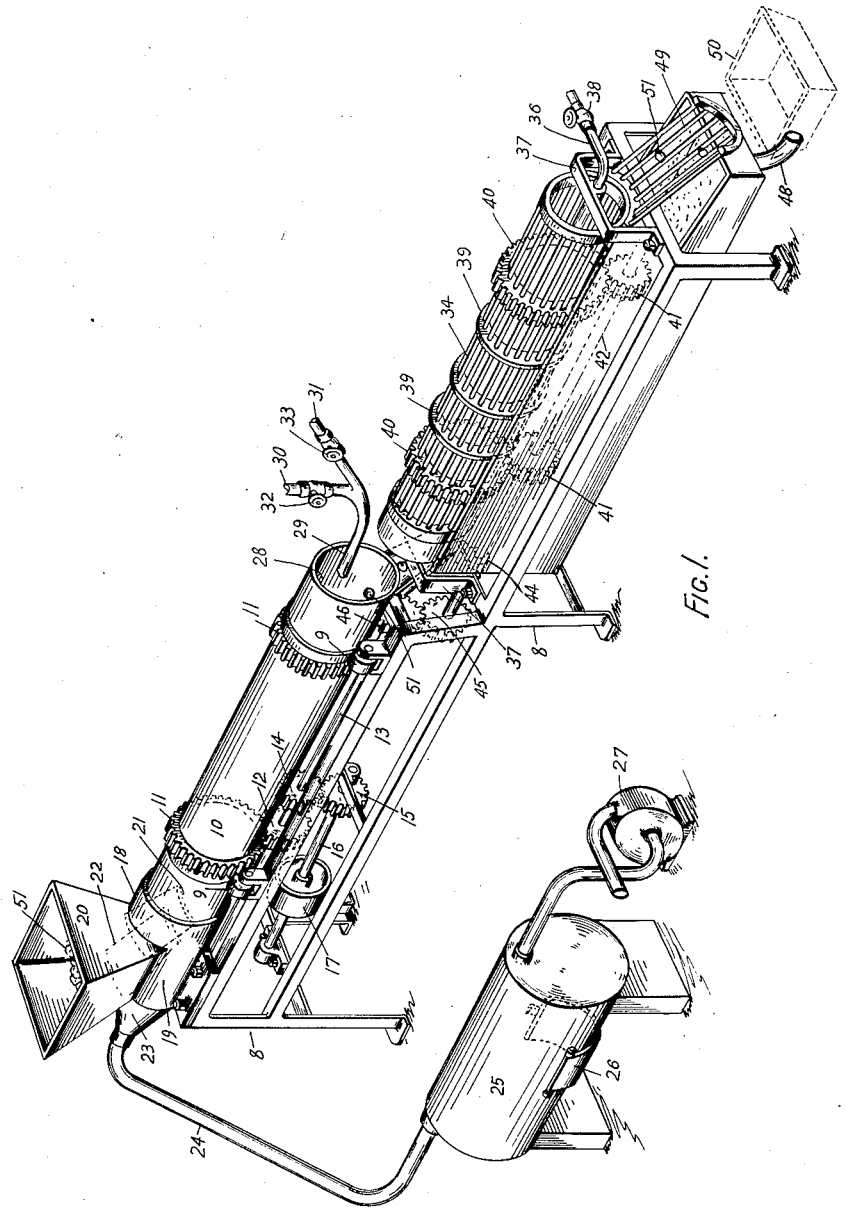

Dec. 11, 1934.    L. C. SOUTHAN    1,984,237
APPARATUS FOR REMOVING SKINS FROM ONIONS
Filed Sept. 30, 1931    2 Sheets-Sheet 1

L. C. Southan
INVENTOR
By: Marks & Clerk
Attys.

Dec. 11, 1934. L. C. SOUTHAN 1,984,237
APPARATUS FOR REMOVING SKINS FROM ONIONS
Filed Sept. 30, 1931 2 Sheets-Sheet 2
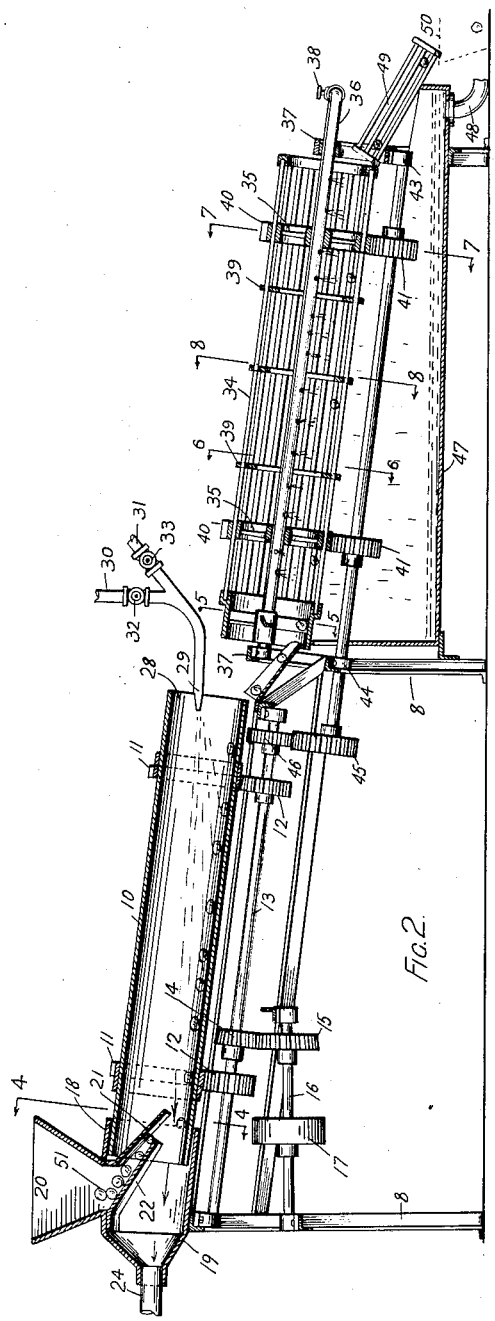
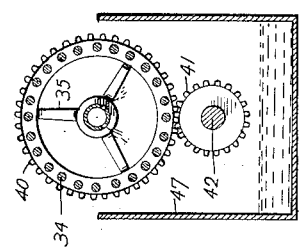
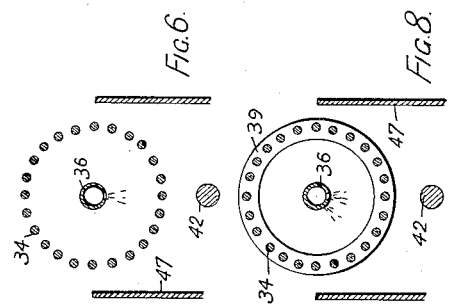
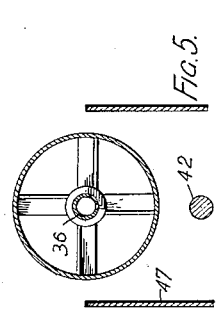
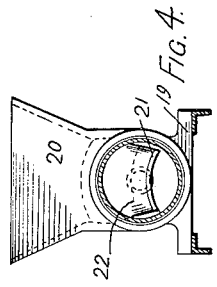
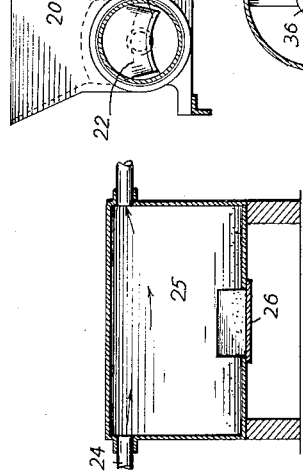
L. C. Southan
INVENTOR
By Marks & Clerk
ATTYs.

Patented Dec. 11, 1934

1,984,237

UNITED STATES PATENT OFFICE 1,984,237

APPARATUS FOR REMOVING SKINS FROM ONIONS

Laurence Cyril Southan, Kensington, near Sydney, Australia

Application September 30, 1931, Serial No. 566,140
In Australia May 1, 1931

4 Claims. (Cl. 146—46)

Hitherto the skins of onions generally after the latter had been soaked in brine had to be removed by hand and the operation has been unpleasant, injurious to workers, tardy and expensive.

This invention has been specially devised in order to provide an improved apparatus for removing skins from onions whereby the unpleasant, injurious and expensive removal by hand is obviated, and the cost of removal, and preparation of the onions for pickling and/or other use is considerably reduced and expedited.

The improved apparatus for removing skins from onions comprises a rotatable cylinder preferably declined from the receiving to the discharge end, at the receiving end for reception of the onions a stationary hopper and having its base about said end, a fan, pump, or other means of exhaust in communication with said end and preferably through a collecting chamber adapted to be cleared, a gas or other suitable burner entered in the other end of said cylinder, adapted to throw a fierce flame as desired, and for connection to a fuel and an air pressure supply pipes, and a rotatable extension of or further cylinder which may contain, or have its wall coated or lined with, a suitable abrasive, or be formed to effect attrition such as by abrasion, rubbing, or tumbling.

And in order that the invention and a practical application thereof will be readily understood the same will now be described with reference to the accompanying drawings in which;

Figure 1 is a perspective,
Figure 2 is a longitudinal sectional elevation,
Figure 3 is a longitudinal section of the collecting chamber in Figure 1,
Figure 4 is a section on the line 4—4 in Figure 2,
Figure 5 is a section on the line 5—5 in Figure 2,
Figure 6 is a section on the line 6—6 in Figure 2,
Figure 7 is a section on the line 7—7 in Figure 2, and
Figure 8 is a section on the line 8—8 in Figure 2.

On one end of a suitable supporting frame 8 carrying rollers 9 is a rotatable declined cylinder 10 carrying gears 11 in mesh with pinions 12 on a shaft 13 whereon is a pinion 14 in mesh with a gear 15 on a driving shaft 16 carrying belt pulley 17 whereby said cylinder is rotated, and about the upper end of said cylinder 10 is one end 18 of the base 19 of a feed hopper 20 which is affixed to the frame 8 and carries a draught deflector 21 and an onion slide and draught deflector 22 each projecting into the cylinder, and from the other contracted end 23 of said base 19 is a pipe 24 to one end of a collecting chamber 25 which has an opening with a closure 26 thereover, and is connected at the other end to fan, pump or other exhaust means 27. Projecting into the lower end 28 of the cylinder 10 is a forced feed burner 29 connected to and supported by a fuel supply pipe 30 and an air pressure pipe 31 each provided with a control cock 32 and 33 respectively.

On the other end of the supporting frame 8 is a rotatable interstitial or gridded attrition cylinder 34 carried by spiders 35 (Figure 2) revolvable on a perforated pipe 36 constituting an axle in brackets 37 upon said frame 8, said pipe being adapted for connection to a liquid supply through a control cock 38, and said cylinder 34 has therein a plurality of longitudinally spaced baffles 39 and carries gears 40 in mesh with pinions 41 on a shaft 42 which is mounted in bearings 43 and 44 on said frame 8 and carries a gear 45 which is in mesh with a gear 46 upon the shaft 13. Under said cylinder 34 to collect water and particles falling therethrough is a trough 47 having a discharge 48, and at the end of said cylinder is a chute 49 whereunder a receptacle 50 may be placed to receive onions 51 as they are discharged from said cylinder.

To remove the skins from onions 51 the usual initial brining of the latter is dispensed with and they are fed into the hopper 20 and pass into the rotating cylinder 10 which causes them to revolve and gradually work therealong while subjected to the action of a fierce flame from burner 29 which burns and/or scorches off their skins, the burnt and removed particles and the product of combustion being drawn from the cylinder 10 through the chamber 25 by the exhaust means 27, the particles being collected in said cylinder and removed as necessary, and the combustion products being discharged therefrom. As the onions 51 emerge from cylinder 10 they pass into the cylinder 34 where they are subjected to attrition, owing to the tumbling, rubbing, and/or abrasing action, which is increased by the baffles 39 causing the onions to bank up, preferably in the presence of water which is supplied to and issues from the perforated pipe 36, any particles of remaining burned or scorched skin and/or roughness being removed as the onions 51 are rolled and work along said cylinder from which they pass out and down chute 49 into a receptacle 50 placed thereunder to receive them, the liquid and particles falling through the cylinder 34 being collected in trough 47 and discharged to waste.

I claim:—

1. Improved apparatus for removing skins from onions comprising, a rotatable cylinder adapted for supply of onions thereinto and to be rotated, means for supplying flame direct into said cylinder, suctional means for withdrawing therefrom burned particles and products of combustion, and means for subjecting the singed or burnt onions to attrition.

2. Improved apparatus for removing skins from onions comprising, a rotatable cylinder adapted for supply of onions thereinto and to be rotated, means for supplying flame into said cylinder, suctional means for withdrawing therefrom burned particles and products of combustion, and a longitudinally gridded or interstitial tumbler cylinder adapted to be rotated, and to receive onions emerging from the first mentioned cylinder and to discharge same.

3. Improved apparatus for removing skins from onions comprising, a rotatable cylinder adapted for supply of onions thereinto and to be rotated, means for supplying flame into said cylinder, suctional means for withdrawing therefrom burned particles and products of combustion, a longitudinally gridded or interstitial tumbler cylinder adapted to be rotated and to receive onions emerging from the first mentioned cylinder and to discharge same and means for discharging water to said tumbler cylinder.

4. Improved apparatus for removing skins from onions comprising, a rotatable cylinder mounted upon a convenient support, a feed hopper about one end of said cylinder and connected to exhaust means, means for rotating said cylinder, means for supplying flame in said cylinder, a rotatable longitudinally gridded or interstitial tumbler cylinder adapted to receive onions emerging from the first mentioned cylinder and to discharge same, means for rotating said tumbler cylinder, and means for discharging water thereto.

LAURENCE CYRIL SOUTHAN.